UNITED STATES PATENT OFFICE.

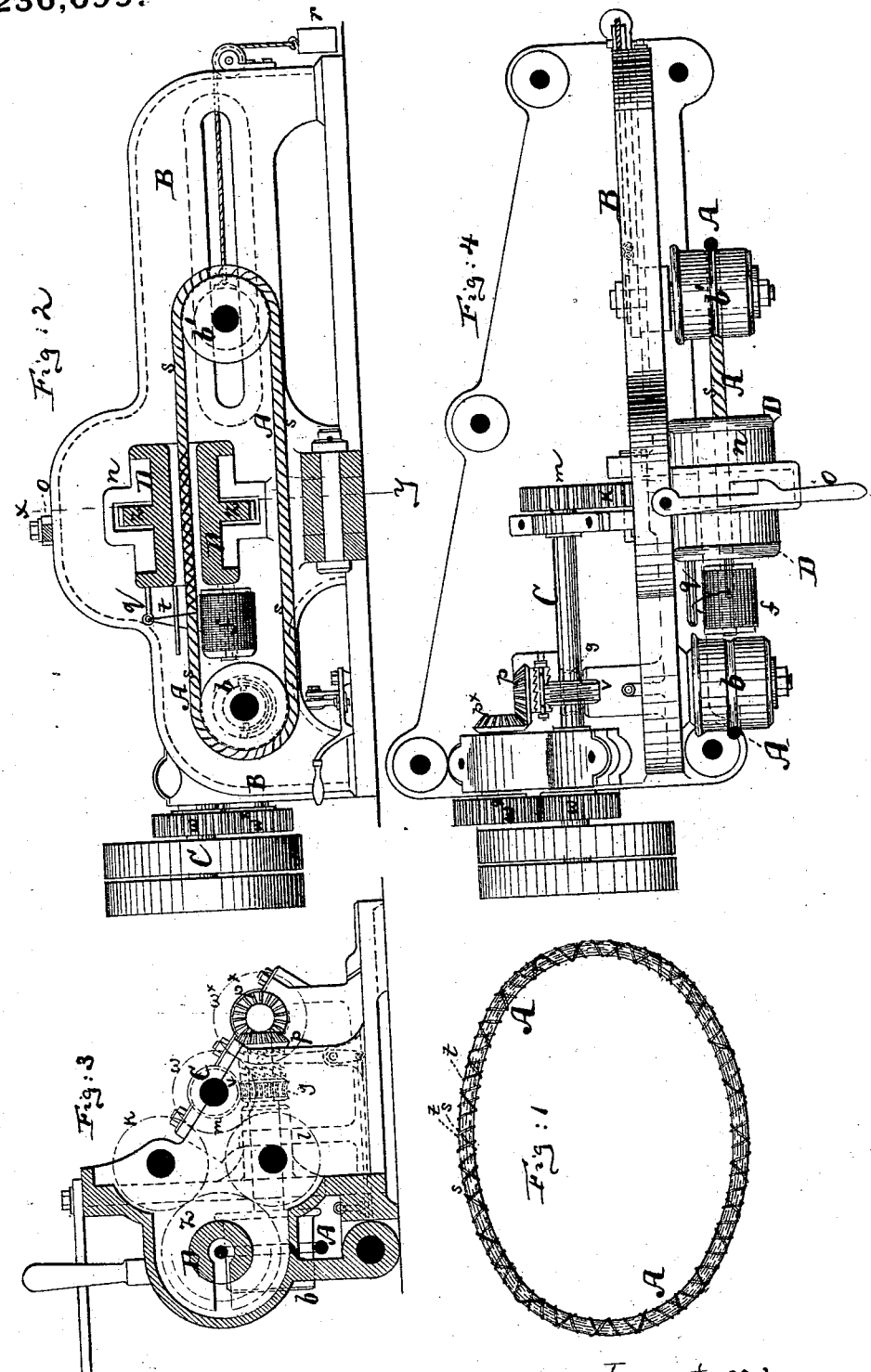

HEINRICH BOLLINGER, OF MAILAND, ITALY.

MACHINE FOR MAKING ASBESTUS PACKING.

SPECIFICATION forming part of Letters Patent No. 236,699, dated January 18, 1881.

Application filed August 13, 1880. (No model.)

*To all whom it may concern:*

Be it known that I, HEINRICH BOLLINGER, of Mailand, Italy, have invented a new and Improved Machine for Making Asbestus Packing, of which the following is a specification.

Figure 1 is a side view of a ring of asbestus made according to my invention. Fig. 2 is a sectional front elevation of the machine for making the same. Fig. 3 is a vertical cross-section of said machine, taken on the line $x\ y$, Fig. 2. Fig. 4 is a top view of said machine.

This invention relates to a new machine for making asbestus packing.

It consists in the new combination of parts for laying the thread and wire around said annular packing.

The packing A (shown in Fig. 1) is a ring of asbestus covered with a thread or threads, $s$, of asbestus. In many cases where durability is specially required, I further wind around said ring A $s$ a fine metal wire, $t$, which incloses the asbestus ring and protects it against rapid abrasion, preventing it also from falling apart under pressure.

The machine for making the packing is constructed as follows:

Two drums, $b\ b'$, grooved to receive the asbestus strand, are hung in a frame, B. The drum $b'$ can be adjusted at the desired distance from the drum $b$, according to the greater or less diameter of the ring to be produced. The shaft of the drum $b$ carries a loose worm-wheel, $g$, and can, by suitable clutch mechanism, be joined to a bevel-gear wheel, $p$, or to said worm-wheel $g$.

C is the driving-shaft, revolved by suitable belt or other machinery. It carries a toothed wheel, $w$, which gears into another toothed wheel, $w^x$, on a shaft that has a bevel-gear wheel, $p^x$, which is in gear with wheel $p$. Thus by revolving the shaft C the drum $b$ will be turned rapidly, provided the shaft of $b$ is clutched to wheel $p$.

The worm-wheel $g$ on shaft of drum $b$ matches into a worm, $v$, on the shaft C, for turning the drum $b$ slower, whenever the said drum is clutched to wheel $g$ and not to wheel $p$. The shaft C also carries a toothed wheel, $m$, which is in gear with two toothed wheels, $k$ and $l$, of equal diameters, both $k$ and $l$ gearing into a toothed wheel, $z$, that is attached to and embraces a hollow drum, D. This hollow drum is laid into suitable boxing in the frame B, and is held in place by a hinged cover, $n$, that is locked by a lever, $o$. The drum D is slotted longitudinally, and also the wheel $z$, as shown, and I use the two wheels $k$ and $l$, so that when one is opposite the slot of $z$ the other will be in full gear therewith, thus maintaining the continuity of the revolution of the drum D. The drum D carries at one end a spool, $f$, wound with asbestus thread, and also a thread-guide, $q$.

The operation is as follows: The asbestus for the core of the endless band is laid around the drums $b\ b'$, so as to pass through the slot of drum D, said asbestus having first been formed into a ring of the desired diameter. The wheel $p$ is then thrown into connection with the shaft of drum $b$ and the shaft C revolved. This causes the drum $b$ to be turned and also the drum D, and the asbestus from spool $f$ to be wound around the asbestus strand or ring, producing the spiral layer $s$ of thread around the core. The asbestus ring is thus made firm and compact. If a further winding, $t$, of wire is desired, the spool $f$ is removed after the asbestus thread has been wound, and another similar spool wound with wire placed on the drum D. The clutch is then moved to throw the worm $g$ into and the wheel $p$ out of action, and the shaft C then revolved. The band A will now travel much slower than before and cause a closer winding of the wire than of the previously-applied asbestus thread. The slot in drum D permits the insertion therein and removal therefrom of the endless band of asbestus. Thus the endless packing A shown in Fig. 1 is produced.

The mechanism for imparting rotary motion to the drums $b$ and D can of course be varied, also that for regulating their respective rates of speed, without departure from the spirit of my invention.

The requisite tension of band A is obtained by means of a weight, $r$, on drum $b'$, or by an equivalent spring.

I claim—

1. The hollow drum D, carrying an eccentric pin for holding the spool $f$, and made with a longitudinal slot, in combination with drums $b$ and $b'$, for operation on an endless band, A, around which the drum D revolves, and with mechanism for revolving the same, substantially as herein shown and described.

2. The drum D, carrying toothed wheel $z$, spool $f$, thread-guide $q$, and provided with longitudinal slot for receiving endless band A, in combination with two equal gear-wheels, $k$ and $l$, engaging said wheel $z$ and serving to turn it continuously, substantially as herein shown and described.

This specification signed by me this 26th day of May, 1880.

HEINRICH BOLLINGER.

Witnesses:
CARL T. BURCHARDT,
MARKUS M. ROTTEN.